(12) United States Patent
Lin

(10) Patent No.: US 6,401,503 B1
(45) Date of Patent: Jun. 11, 2002

(54) VEHICLE STEERING WHEEL LOCK

(76) Inventor: Tsann-Hwang Lin, 44-6, Chiang-Tzy-Ke, Heh-Ping Village, Chia-Yi Hsien (TW)

( * ) Notice: Subject to any disclaimer, the term of this patent is extended or adjusted under 35 U.S.C. 154(b) by 0 days.

(21) Appl. No.: 09/928,306

(22) Filed: Aug. 14, 2001

(51) Int. Cl.[7] .............................................. B60R 25/02
(52) U.S. Cl. ............................. 70/209; 70/226; 70/237
(58) Field of Search ........................... 70/209–212, 225, 70/226, 237, 238

(56) References Cited

U.S. PATENT DOCUMENTS

| | | | | |
|---|---|---|---|---|
| 5,537,847 A | * | 7/1996 | Dalton et al. .................. | 70/209 |
| 5,782,116 A | * | 7/1998 | Ryan et al. .................... | 70/209 |
| 5,836,186 A | * | 11/1998 | Winner ......................... | 70/209 |
| 5,868,016 A | * | 2/1999 | Duran .......................... | 70/209 |
| 5,875,661 A | * | 3/1999 | Ho .............................. | 70/209 |
| 5,887,464 A | * | 3/1999 | Perez ........................... | 70/209 |
| 5,992,190 A | * | 11/1999 | Townsend .................... | 70/209 |
| 6,016,674 A | * | 1/2000 | Yang ............................ | 70/209 |
| 6,109,076 A | * | 8/2000 | Kajuch ......................... | 70/209 |
| 6,116,062 A | * | 9/2000 | Markegard et al. ....... | 70/226 X |
| 6,199,415 B1 | * | 3/2001 | Markegard et al. .......... | 70/209 |

* cited by examiner

*Primary Examiner*—Suzanne Dino Barrett
(74) *Attorney, Agent, or Firm*—Larson & Taylor, PLC

(57) ABSTRACT

A vehicle steering wheel lock comprises a first plate and a second plate that can be engaged onto a steering wheel of a vehicle for protecting the vehicle or an air bag in the steering wheel from being stolen. The first plate and the second plate can be engaged with each other in a manner having a smaller overall area for convenient storage.

4 Claims, 4 Drawing Sheets

VEHICLE STEERING WHEEL LOCK

BACKGROUND OF THE INVENTION

1. Field of the Invention

The present invention relates to a vehicle steering wheel lock having a reduced area for convenient storage.

2. Description of the Related Art

FIG. 5 of the drawings illustrates a conventional vehicle steering wheel lock comprising a cover or casing 1 having at least two sets of positioning holes 11, a locking rod 2 having a lock 22 and a hook 21, and a telescopic rod 3 having plural positioning notches 32 and a hook 31. After placing the casing 1 onto the steering wheel 4, the hook 21 of the locking rod 2 is engaged with one of a first set of positioning holes 11, and the hook 31 of the telescopic rod is engaged with one of a second set of positioning holes 11. The locking rod 2 and the telescopic rod 3 are then moved away from each other until the hooks 21 and 31 are engaged with a rim or spoke of the steering wheel 4. This protects the vehicle or an air bag in the steering wheel 4 from being stolen. However, the casing 1 must be large enough to cover the overall steering wheel 4 and thus require a considerable area, which in turn causes inconvenient storage in the vehicle.

SUMMARY OF THE INVENTION

It is an object of the present invention to provide an improved vehicle steering wheel lock having a reduced area for convenient storage. In addition, the vehicle steering wheel lock can be used with steering wheels of various sizes and shapes without adversely affecting its anti-theft function.

A vehicle steering wheel lock comprises a first plate and a second plate that can be engaged onto a steering wheel of a vehicle for protecting the vehicle or an air bag in the steering wheel from being stolen. The first plate and the second plate can be engaged with each other in a manner having a smaller overall area for convenient storage.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
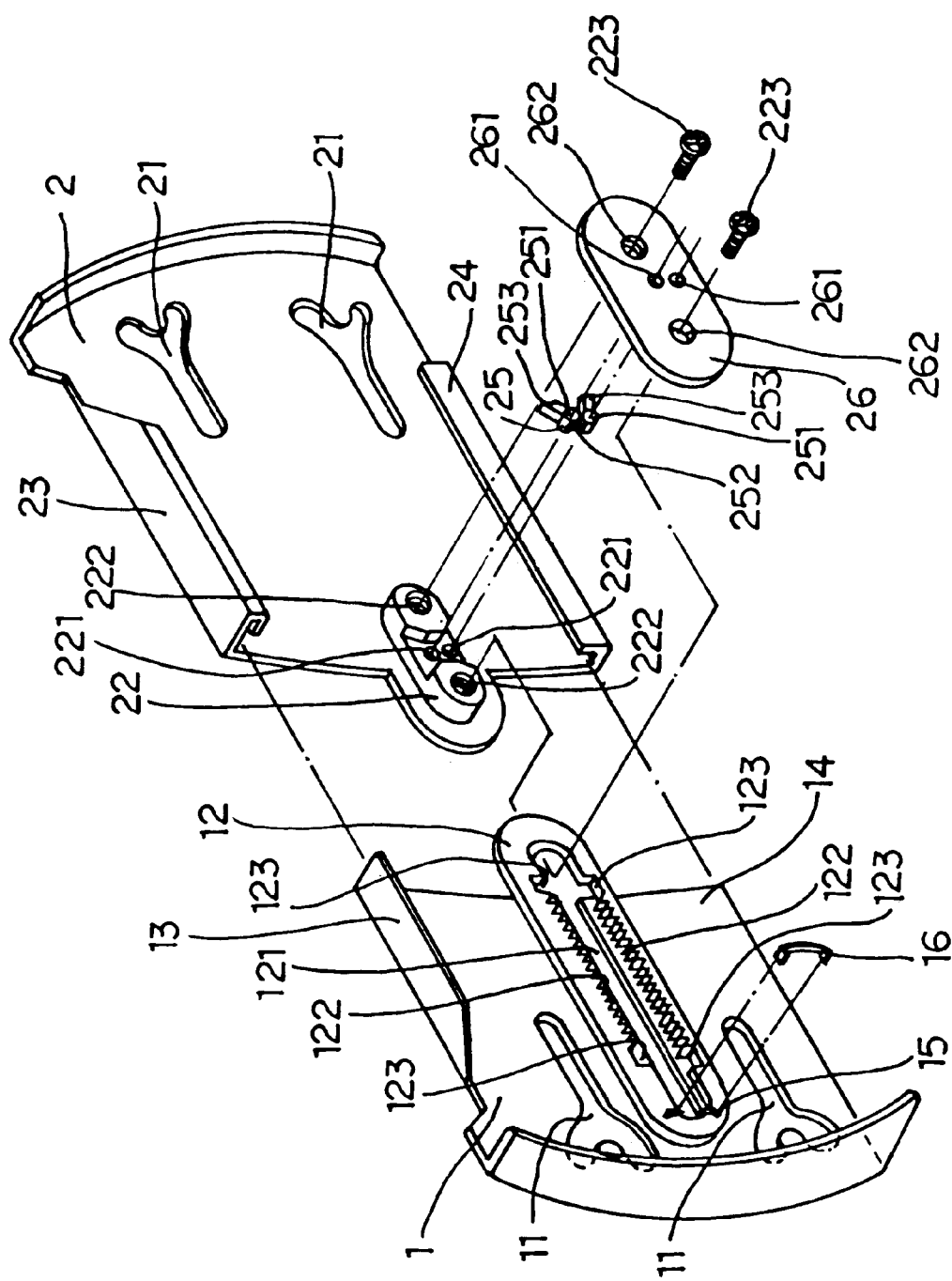
FIG. 1 is an exploded perspective view of a vehicle steering wheel lock in accordance with the present invention.
Figure 2:
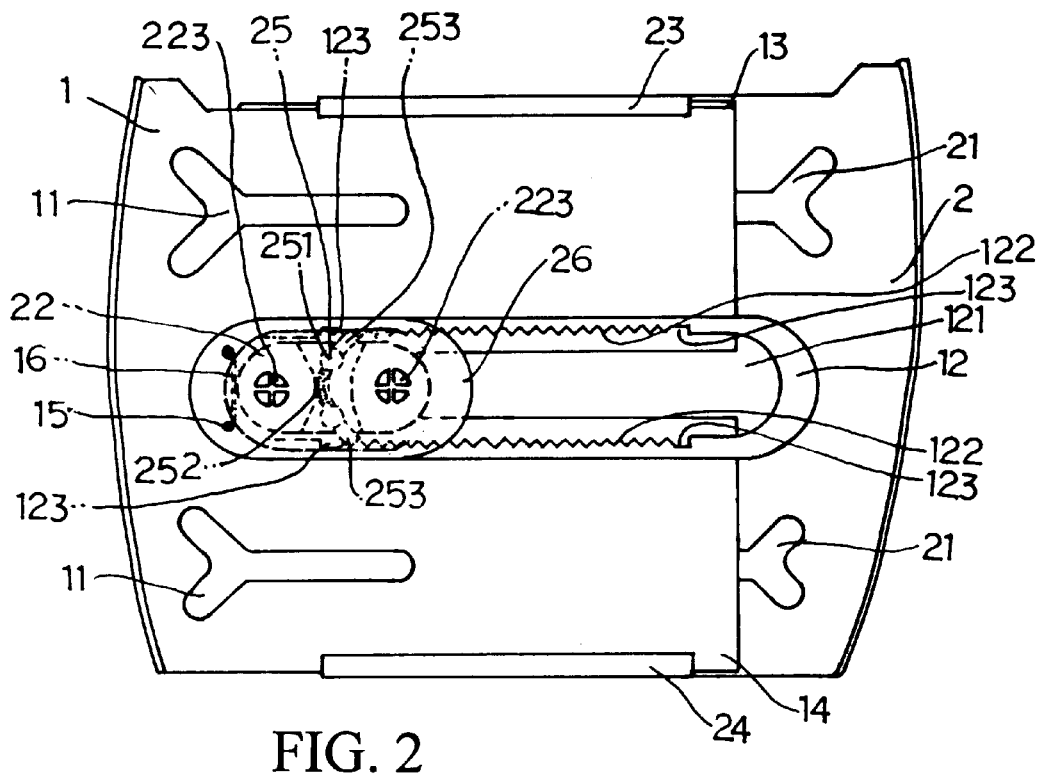
FIG. 2 is a plan view of the vehicle steering wheel lock in accordance with the present invention, wherein a first plate and a second plate of the vehicle steering wheel lock are in a state with a reduced overall area.

Referring to FIGS. 1 and 2, a vehicle steering wheel lock in accordance with the present invention generally comprises a first plate 1 and a second plate 2. The first plate 1 is made of a rigid metal material and thus difficult to destroy. The first plate 1 comprises plural Y-shaped positioning holes 11 each of which can be selected to match with one of plural Y-shaped positioning holes 21 in the second plate 2. A hook (not shown) of a locking tube (not shown) is engaged in one of the Y-shaped positioning holes 11 of the first plate 1, and a hook (not shown) of a telescopic rod (not shown) slidably received in the locking tube is engaged in one of the Y-shaped positioning holes 21 of the second plate 2. The hooks are engaged with the spoke or rim of the steering wheel.

A toothed plate 12 is fixed (such as by welding) to the first plate 1. The toothed plate 12 comprises a central groove 121 for slidably receiving a block 22. Each of an upper wall and a lower wall defining the central groove 121 has a row of teeth 122, two notches 123 being defined on both sides of the row of teeth 122. A substantially curve shaped groove 15 is defined in an end of the toothed plate 12 that is distal to the second plate 2, and a resilient plate 16 is received in the groove 15.

Formed on an upper end of the first plate 1 is a wing 13 that is slidably received in a substantially P-shaped track 23 on an upper end of the second plate 2. The wing 13 can be formed by means of bending the upper end of the first plate 1 and the P-shaped track 23 can be formed by means of bending the upper end of the second plate 2. A lower end 14 of the first plate 1 is slidably received in a substantially L-shaped track 24 on a lower end of the second plate 2. The L-shaped track 24 can be formed by means of bending the lower end of the second plate 2. Thus, vertical deviation is prevented when the first plate 1 slides in the second plate 2.

The second plate 2 is made of a rigid metal material and thus difficult to destroy. The above-mentioned block 22 is fixed (such as by welding) to the second plate 2 and comprises two holes 221 in a central portion thereof. A stop 25 includes two sections 253 each having an inner end to which a peg 251 is formed and an outer end. Each peg 251 includes an end pivotally received in an associated one of the holes 221 of the second plate 2. An elastic element 252 is mounted between the pegs 251 for urging the two sections 253 apart. Located on both sides of the holes 221 of the block 22 are screw holes 222 for engaging with a lid 26. The lid 26 comprises two holes 261 in a central portion thereof through which the other ends of the two pegs 251 are pivotally received. Bolts 223 are extended through screw holes 262 in the lid 26 and the screw holes 222 of the block 22 to prevent disengagement of the stop 25.

Referring to FIG. 2, when the right portion of the first plate 1 is retracted into the second plate 2, the left side of the block 22 is stopped by the resilient plate 16 such that the two sections 253 of the stop 25 are urged towards each other and the outer end of each section 253 of the stop 25 is engaged with the leftmost one of an associated row of teeth 122 in front of the respective left notch 123. As a result, the first plate 1 cannot slide leftward and a portion of the first plate 1 is retained inside the second plate 2.

Figure 3:
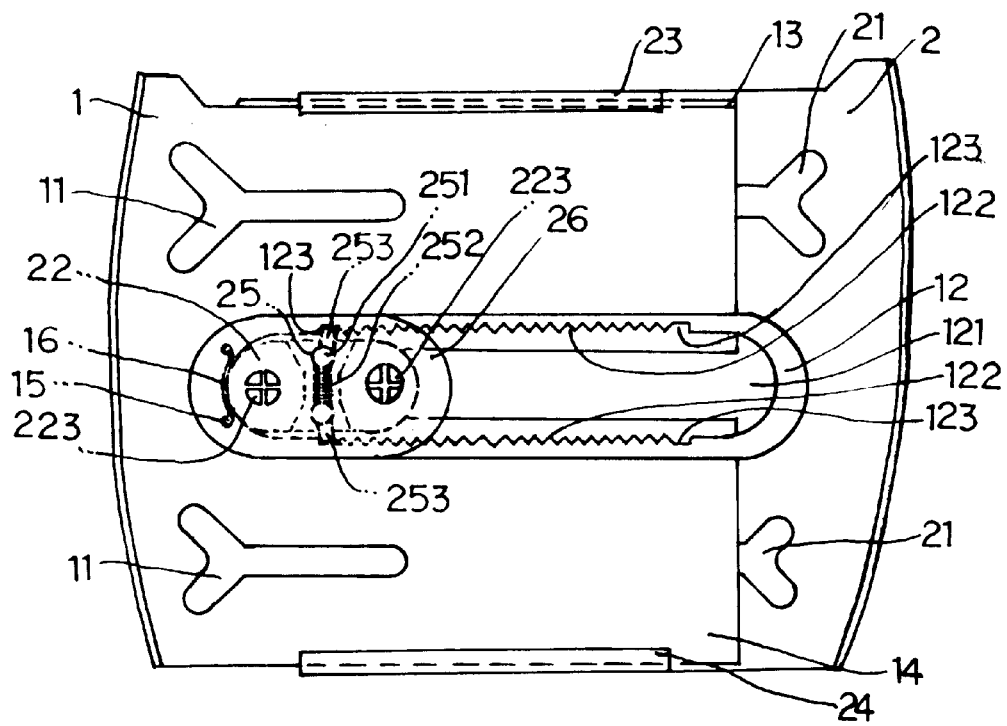
FIG. 3 is a plan view similar to FIG. 2, illustrating operation of a block of the second plate.
Figure 4:
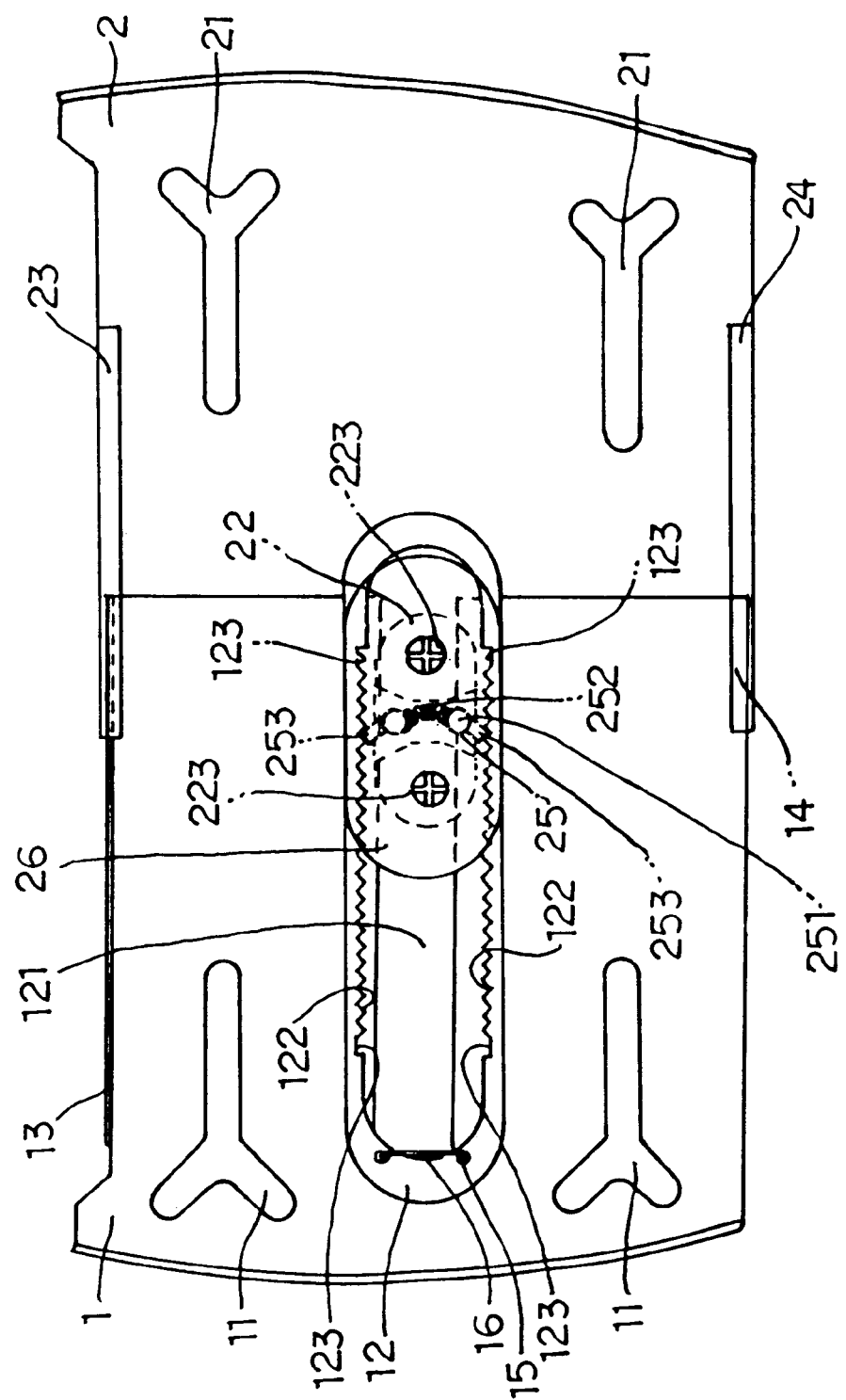
FIG. 4 is a view similar to FIG. 2, illustrating rightward movement of the second plate relative to the first plate.
Figure 5:
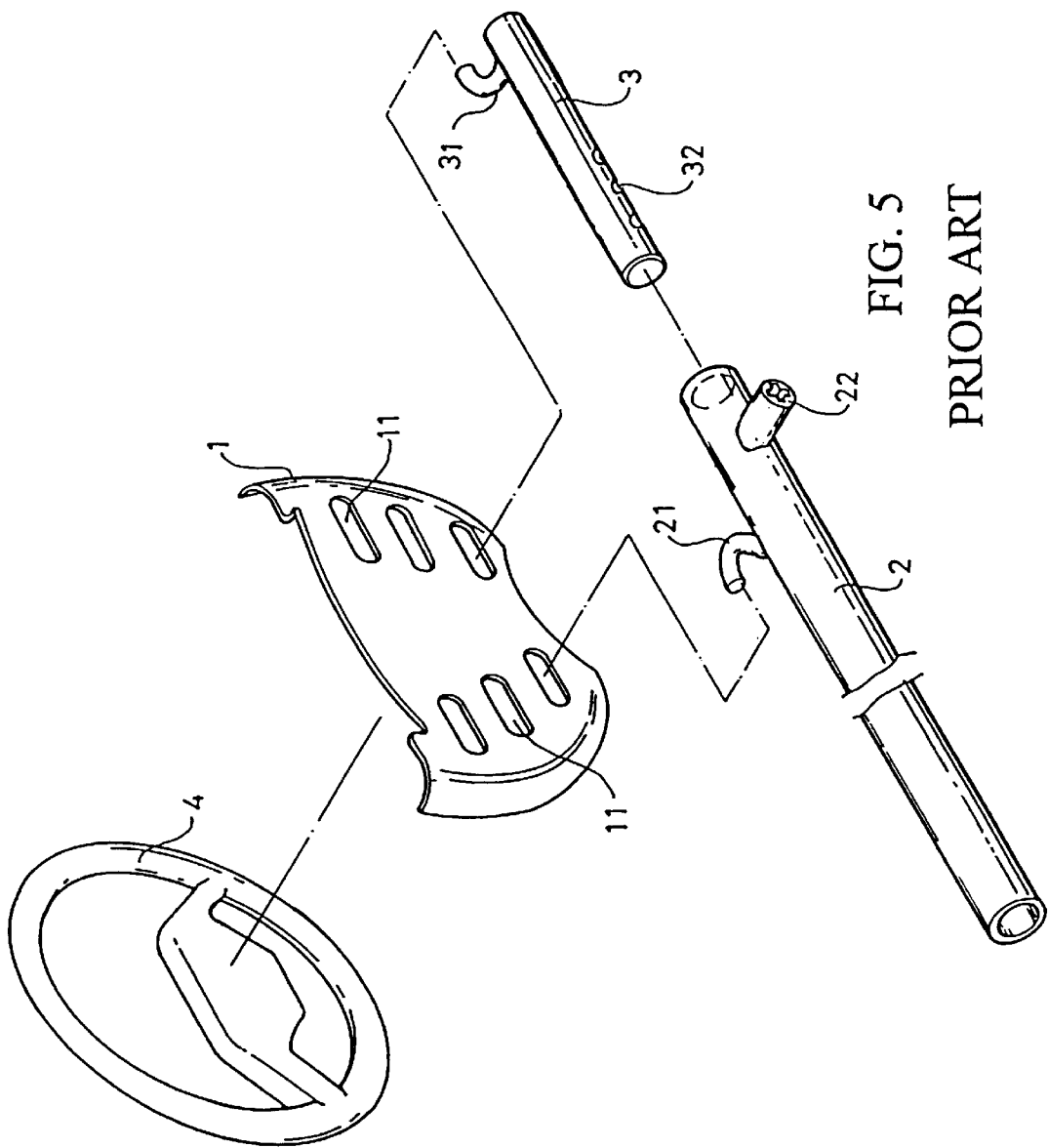
FIG. 5 is an exploded view of a conventional vehicle steering wheel lock.

Referring to FIG. 3, when the user applies a force to move the block 22 of the second plate 2 leftward, the resilient plate 16 is deformed and thus no longer on the way of the block 22. The outer end of each section 253 of the stop 25 enters the respective left notch 123 of the toothed plate 12. At this time, the two sections 253 of the stop 25 are urged apart under the action of the elastic element 252 acting on the outer ends of the sections 253 of the stop 25. When the user moves the block 22 rightward, as illustrated in FIG. 4, the two sections 253 of the stop 25 are urged towards each other and the outer ends of the sections 253 move across the rows of teeth 122. The outer end of each section 253 of the stop 25 can be engaged with the desired one of the respective row of teeth while the block 22 cannot be moved leftward.

If the first plate 1 and the second plate 2 are not positioned in the optimal position for locking the steering wheel, the user may move the block 22 rightward until the outer ends of the sections 253 of the stop 25 respectively enter the right notches 123 of the toothed plate 12. At this time, the two sections 253 of the stop 25 are urged apart again under the action of the elastic element 252 acting on the outer ends of the sections 253 of the stop 25. The user may then move the block 22 of the second plate 2 leftward until the first and second plates 11 and 12 are located in the optimal position for locking the steering wheel. It is noted that the two sections 253 of the stop 25 are now urged towards each other, and the outer end of each section 153 of the stop 15 can be engaged with the desired one of the respective row of teeth while the bolck 22 cannot be moved rightward.

When the first and second plates 11 and 12 are engaged together and have an overall size that is appropriate for locking the steering wheel, the engaged first and second plates 11 and 12 are placed on the spoke (not shown) and/or rim (not shown) of the steering wheel (not shown). At this time, as mentioned above, a hook (not shown) of a locking tube (not shown) is engaged in one of the Y-shaped positioning holes 11 of the first plate 1, and a hook (not shown) of a telescopic rod (not shown) slidably received in the locking tube is engaged in one of the Y-shaped positioning holes 21 of the second plate 2. The hooks are engaged with the spoke or rim of the steering wheel to thereby prevent the vehicle or an air bag of the vehicle from being stolen.

When not in use, after unlocking, the hook of the locking tube is disengaged from the Y-shaped positioning hole 11 of the first plate 1 and the hook of the telescopic tube is disengaged from the Y-shaped positioning hole 21 of the second plate 2, and the first and second plates 1 and 2 are then removed from the steering wheel 1. The first plate 1 and the second plate 2 may engage with each other to have the minimized area for convenient storage without the risk of disengagement therebetween. It is easily achieved by means of moving the block 22 leftward until the left side of the block 22 is stopped by the resilient plate 16. Thus, the outer end of each section 253 of the stop 25 is engaged with the leftmost one of the associated row of teeth 122 in front of the respective left notch 123. As a result, the first plate 1 cannot be disengaged from the second plate 2 and a portion of the first plate 1 is retained inside the second plate 2.

Although the invention has been explained in relation to its preferred embodiment, it is to be understood that many other possible modifications and variations can be made without departing from the scope of the invention as hereinafter claimed.

What is claimed is:

1. A vehicle steering wheel lock comprising:

a first plate comprising a toothed plate securely mounted thereto, the toothed plate comprising a central groove defined by an upper wall and a lower wall, the upper wall including two first notches and a first row of teeth between the first notches, the lower wall including two second notches and a second row of teeth between the second notches; and a second plate comprising a block securely mounted thereto, the block being slidably received in the central groove of the first plate, the block comprising two holes in a central portion thereof, the block comprising two screw holes on both sides if the holes for coupling with a lid by two bolts, and a stop comprising two pegs each having a first end received in an associated one of the holes of the block, wherein said stop selectively engages said first and second row of teeth and said first and second notches.

2. The vehicle steering wheel lock as claimed in claim 1, wherein the toothed plate comprises an end distal to the second plate, the end of the toothed plate comprising a curveshaped groove.

3. The vehicle steering wheel lock as claimed in claim 1, wherein the first plate comprises a wing on an upper end thereof, the second plate comprising a P-shaped groove on an upper end thereof for slidably receiving the wing of the first plate, the first plate comprising a lower end, the second plate comprising an L-shaped groove on a lower end thereof for slidably receiving the lower end of the first plate, thereby preventing vertical deviation when the first plate slides in the second plate.

4. The vehicle steering wheel lock as claimed in claim 1, wherein each of the first plate and the second plate comprises at least one set of Y-shaped positioning holes.

* * * * *